US006689987B2

(12) United States Patent
Altekruse et al.

(10) Patent No.: US 6,689,987 B2
(45) Date of Patent: Feb. 10, 2004

(54) WELDING CONTACT TIP WITH ROLLED THREADS

(75) Inventors: Kenneth C. Altekruse, Appleton; Ronald W. Colling, Kaukauna, both of WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/785,937

(22) Filed: Feb. 16, 2001

(65) Prior Publication Data
US 2002/0113048 A1 Aug. 22, 2002

(51) Int. Cl.7 .............................. B23K 9/28; B23K 9/16
(52) U.S. Cl. ........................ 219/137.61; 219/137.42
(58) Field of Search ..................... 219/137.61, 137.42, 219/137.31

(56) References Cited

U.S. PATENT DOCUMENTS

| 2,666,832 A | 1/1954 | Landis et al. ................... 219/8 |
| 2,761,049 A | 8/1956 | McElrath et al. ............... 219/14 |
| 2,769,894 A | 11/1956 | Rives ........................... 219/130 |
| 2,797,301 A | 6/1957 | Copleston ..................... 219/75 |
| 2,808,498 A | 10/1957 | Hudson et al. ................ 219/130 |
| 3,007,033 A | 10/1961 | Newman et al. .............. 219/137 |
| 3,025,387 A | 3/1962 | Kinney .......................... 219/130 |
| 3,143,633 A | 8/1964 | Wadleigh ...................... 219/130 |
| 3,207,885 A | 9/1965 | Rieger .......................... 219/130 |
| 3,283,121 A | 11/1966 | Bernard et al. ............... 219/130 |
| 3,428,778 A | 2/1969 | Blackman et al. ........... 219/130 |
| 3,469,070 A | 9/1969 | Bernard et al. ............... 219/130 |
| 3,514,570 A | 5/1970 | Bernard et al. ............... 219/130 |
| 3,544,758 A | 12/1970 | DalMolin ..................... 219/130 |
| 3,689,733 A | 9/1972 | Matasovic ................... 219/130 |
| 3,909,585 A | 9/1975 | Sanders et al. .............. 219/130 |
| 4,250,366 A | 2/1981 | Erickson et al. ............. 200/157 |
| 4,268,740 A | 5/1981 | Sanders ..................... 219/137.51 |
| 4,282,419 A | 8/1981 | Auer ......................... 219/137.44 |
| 4,297,561 A | 10/1981 | Townsend et al. ......... 219/137.63 |
| 4,361,747 A | 11/1982 | Torrani ......................... 219/75 |
| 4,403,136 A | 9/1983 | Colman ..................... 219/137.31 |
| 4,482,797 A | 11/1984 | Shiramizu et al. ......... 219/137.61 |
| 4,544,827 A | 10/1985 | Cusick, III ................. 219/137.63 |
| 4,554,432 A | 11/1985 | Raioff ........................ 219/137.43 |
| 4,560,858 A | 12/1985 | Manning ................... 219/137.52 |

(List continued on next page.)

FOREIGN PATENT DOCUMENTS

| EP | 0 003 781 A1 | 2/1978 | |
| GB | 758 890 | 10/1956 | |
| GB | 1 237 912 | 6/1968 | ............ B23K/9/28 |
| GB | 1 291 500 | 12/1969 | ............ B23K/9/32 |
| GB | 1 385 255 | 9/1972 | ............ B23K/9/26 |

Primary Examiner—M. Alexandra Elve
Assistant Examiner—Kevin McHenry
(74) Attorney, Agent, or Firm—Mark W. Croll; John H. Pilarski

(57) ABSTRACT

A MIG welding gun contact tip has a cylindrical section with a predetermined outer diameter adjacent one end, and frusto-conical surface adjacent the other end. Threads are rolled from the cylindrical section outer diameter between the cylindrical section and the frusto-conical surface. The threads major diameter is larger than the cylindrical section outer diameter, and the threads minor diameter is less than the cylindrical section outer diameter. In a preferred embodiment, the cylindrical section outer diameter is approximately 0.350 inches, the threads have a major diameter of approximately 0.375 inches, and the threads are stub acme threads with a pitch of 14 threads per inch. The contact tip is assembled to a diffuser having mating threads and a frusto-conical surface that engages the contact tip frusto-conical surface when the contact tip has been turned a single turn into the diffuser.

18 Claims, 2 Drawing Sheets

U.S. PATENT DOCUMENTS

| | | | |
|---|---|---|---|
| 4,695,702 A | 9/1987 | Gartland | 219/137.63 |
| 4,702,539 A | 10/1987 | Cusick, III et al. | 439/588 |
| 4,791,266 A | 12/1988 | Gerard | 219/121.48 |
| 4,864,099 A | 9/1989 | Cusick, III et al. | 219/137.62 |
| 4,937,428 A | 6/1990 | Yoshinaka et al. | 219/137.52 |
| 4,945,208 A | 7/1990 | Lian | 219/137.61 |
| 4,978,831 A | 12/1990 | Lian | 219/137.61 |
| 5,097,108 A * | 3/1992 | Hamal | 219/70 |
| 5,338,917 A * | 8/1994 | Stuart et al. | 219/137.63 |
| 5,349,158 A * | 9/1994 | Mari | 219/137.62 |
| 5,384,447 A * | 1/1995 | Raloff et al. | 219/137.31 |
| 5,440,100 A * | 8/1995 | Stuart et al. | 219/137.31 |
| 5,491,321 A * | 2/1996 | Stuart et al. | 219/137.61 |
| 5,726,420 A * | 3/1998 | Lajoie | 219/137.61 |
| 5,760,373 A * | 6/1998 | Colling | 219/137.61 |
| 5,911,894 A * | 6/1999 | Colling | 219/137.61 |
| 6,075,227 A * | 6/2000 | Lajoie | 219/137.61 |
| 6,307,179 B1 * | 10/2001 | Walters, III | 219/137.42 |

* cited by examiner

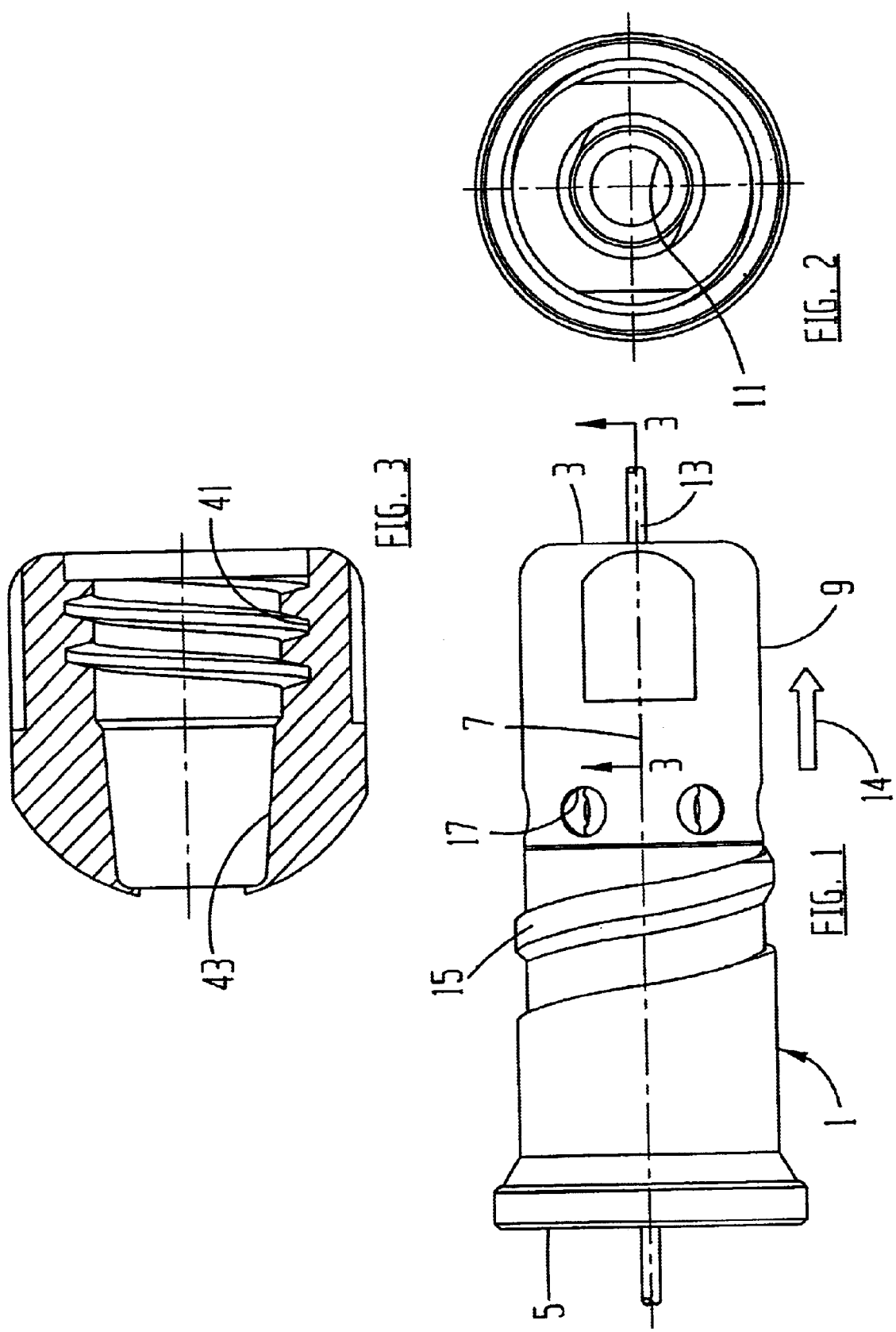

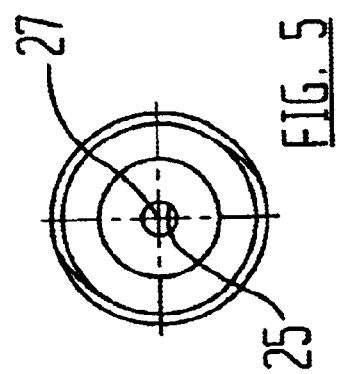
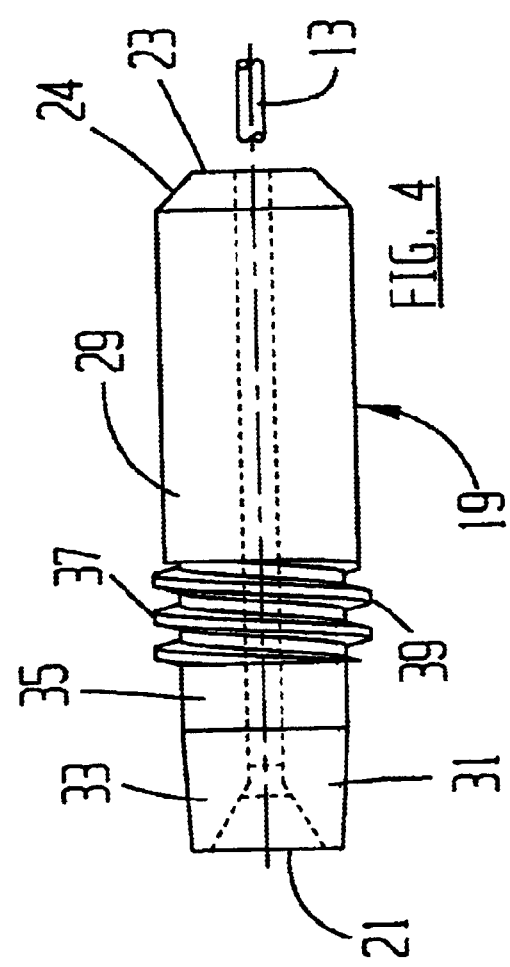

WELDING CONTACT TIP WITH ROLLED THREADS

BACKGROUND OF THE INVENTION

1. Field of the Invention

This invention pertains to electric arc welding guns, and more particularly to the contact tips and diffusers of MIG welding guns.

2. Description of the Prior Art

It is well known to incorporate a contact tip into MIG welding guns. The contact tip guides the weld wire for the last short distance from the gun to the workpiece. In addition to guiding the weld wire, the contact tip also performs the function of conducting electric current to the weld wire. In turn, the electric current must be conducted to the contact tip, which is normally done through an interface with a diffuser.

The dual functions of guiding the weld wire and conducting electric current to it impose severe thermal stresses on the contact tip. Not only is it subjected to very high temperatures from the welding arc, but also the transfer of high current through it tends to produce resistance heating in it. To minimize any temperature increases because of resistance heating due to electrical conduction from the diffuser to the contact tip, it is very desirable that the surface areas in contact between the diffuser and the contact tip be as large as possible. Another advantage of large surface areas in contact is that any heat buildup in the contact tip can be readily conducted away to the diffuser.

Although ongoing improvements have been made to contact tips, under some operating conditions they nevertheless have relatively short service lives. When a contact tip fails, it is important that it be easily and quickly replaced. The consumable nature of contact tips also makes it important that they be as inexpensive as possible consistent with proper performance.

To achieve rapid contact tip replacement, it is known to use a contact tip-diffuser combination in which the contact tip is removed from and replaced onto the diffuser with approximately a single turn of the contact tip. For example, U.S. Pat. No. 5,760,373 describes a prior quick release welding gun contact tip that is disengageable from the diffuser with a single turn. The U.S. Pat. No. 5,760,373 patent also describes a large area of contact between the diffuser and the contact tip.

Despite continued improvements to contact tips and diffusers, further developments are needed.

SUMMARY OF THE INVENTION

In accordance with the present invention, a welding gun contact tip with rolled threads provides both economy and high performance. This is accomplished by a threaded connection between the contact tip and a diffuser that uses custom threads having a pitch diameter that is disproportionately large relative to the size of the contact tip.

The contact tip has upstream and downstream ends and a long hole for guiding a weld wire. Adjacent the downstream end is a cylindrical section. The outer diameter of the cylindrical section can vary to suit welding gun space and functional requirements. However, for many MIG welding guns, a preferred outer diameter for the cylindrical section is approximately 0.350 inches. The upstream end of the contact tip is formed as a tapered section with an exterior frusto-conical surface converging toward the upstream end.

Between the contact tip frusto-conical surface and the cylindrical section is a threaded section. The threaded section is comprised of threads that are rolled from the cylindrical section. The threads are rolled such that their major or crest diameter is larger than the diameter of the cylindrical section, and the threads minor or root diameter is less than the diameter of the cylindrical section. For example, threads rolled from a cylindrical section having the 0.350 inches diameter may have a major diameter of approximately 0.375 inches and a minor diameter of approximately 0.320 inches. Preferably, the threads are stub acme threads.

To facilitate the rolling process, the threads have a special pitch that is finer than the standard stub acme thread corresponding to the thread major diameter. Specifically, for stub acme threads having a major diameter of 0.375 inches, the threads may have a pitch of 14 threads per inch, instead of the standard pitch of 12 threads per inch.

The diffuser has front and back ends and a bore therebetween. The diffuser bore at the back end has conventional threads for connecting with another component of the welding gun. The diffuser bore at the front end has the same custom threads as the contact tip. Adjacent the diffuser custom threads is an interior frusto-conical surface of the same size and shape as the contact tip frusto-conical surface.

The contact tip is assembled to the diffuser by inserting the contact tip upstream end into the diffuser bore at the diffuser front end until the threads of the contact tip abut the threads of the diffuser. The contact tip is turned slightly, if necessary, until the threads of the two components mate. The contact tip is then turned to advance it into the diffuser bore. The threads and frusto-conical surfaces of the two components are so dimensioned that the contact tip frusto-conical surface engages the diffuser frusto-conical surface after about a single turn of the contact tip threads onto the diffuser threads.

When the contact tip is fully assembled on the diffuser, there are two large areas of contact between them for conduction of electric current. The two frusto-conical surfaces present a first large contact area. Second, the increased major diameter of the custom stub acme threads provide a greater contact area between them than would be possible with a contact tip having a threaded section with the threads major diameter equal to the cylindrical section outer diameter. Moreover, only about a single turn is required to remove and replace a worn contact tip.

Other advantages, benefits, and features of the present invention will become apparent to those skilled in the art upon reading the detailed description of the invention.

BRIEF DESCRIPTION OF THE DRAWINGS

FIG. 1 is a front view of the diffuser of the present invention.

FIG. 2 is an end view of FIG. 1.

FIG. 3 is a cross-sectional view on an enlarged scale taken along line 3—3 of FIG. 1.

FIG. 4 is a front view of the contact tip of the invention.

FIG. 5 is an end view of FIG. 4.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1–3, a diffuser 1 is illustrated that includes the present invention. The diffuser 1 is part of a MIG welding gun, not shown but well known to persons skilled in the art. The diffuser is made from an electrically conductive material, and it has a front end 3, a back end 5, a longitudinal axis 7, and a generally cylindrical outer surface 9. The diffuser further has a bore 11 between the ends 3 and 5. A weld wire 13 is fed in a downstream direction 14 through the diffuser bore 11. A liner, not illustrated, inside the diffuser bore guides the weld wire 13 through the diffuser.

In the particular construction illustrated, the diffuser 1 has external threads 15 approximately midway between the ends 3 and 5. The threads 15 are used for assembling a nozzle assembly, not shown, to the diffuser. Radial holes 17 communicate with the diffuser bore 11. The radial holes 17 enable an inert gas that flows in the downstream direction 14 from the welding machine to flow from the bore to outside the diffuser. The nozzle assembly then directs the inert gas to the welding arc.

Turning to FIGS. 4 and 5, the present invention further comprises an electrically conductive contact tip 19. The contact tip 19 has an upstream end 21, a downstream end 23, and a hole 25 centered on the contact tip longitudinal axis 27. The hole 25 is sized to be slightly greater than the diameter of the weld wire 13. The contact tip has a cylindrical section 29 adjacent the downstream end 23, and a tapered section 31 adjacent the upstream end 21. To minimize the cross-sectional area at the downstream end 23, there is a bevel 24 between the downstream end and the cylindrical section 29. The tapered section 31 is formed as an exterior frusto-conical surface 33 that converges toward the upstream end 21. Preferably, the surface 33 of the tapered section 31 converges at an included angle of approximately ten degrees. The base end of the tapered section terminates in a short cylindrical band 35.

For manufacturing and functional purposes, a preferred diameter for the contact tip cylindrical section 29 is approximately 0.350 inches. According to one aspect of the invention, the contact tip 19 is made from a cylindrical blank of copper material having the 0.350 inches diameter.

Between the contact tip cylindrical band 35 and the cylindrical section 29 is a threaded section 37. To optimize the performance of the contact tip 19 with its cost of manufacture, the threaded section 37 consists of a custom threads 39. For a performance purposes, the threads 39 are made with as large a pitch diameter as possible. Accordingly, it is an important feature of the invention that the threads are rolled from the cylindrical section 29 in a manner that produces a major or crest diameter of the thread that is greater than the diameter of the cylindrical section, and a minor or root diameter that is less than the diameter of the cylindrical section. For a cylindrical section with an outer diameter of 0.350 inches, the threads are rolled to have a pitch diameter of approximately 0.343 inches, a major diameter of approximately 0.375 inches, and a minor diameter of approximately 0.320 inches.

In the preferred embodiment, the threads 39 are a 29 degree stub acme thread. In that case, the standard pitch for a major diameter of 0.375 inches is 12 threads per inch. However, for manufacturing purposes, it is advantageous to use a finer pitch. Accordingly, the thread is rolled to have a pitch of 14 teeth per inch. The result is an optimum thread structure of 0.375 inches major diameter and 14 pitch.

Returning to the diffuser 1, FIGS. 1–3, the bore 11 at the front end 3 is manufactured with stub acme threads 41 that receive the threads 39 of the contact tip 19. Specifically, the threads 41 have 14 pitch, a major diameter of approximately 0.392 inches, and a minor diameter of approximately 0.336 inches. Further, the diffuser bore has a frusto-conical surface 43 in the upstream direction from the threads 41. The frusto-conical surface 43 diverges toward the downstream end 23 at the same angle as the contact tip frusto-conical surface 33.

The contact tip 19 is assembled to the diffuser 1 by inserting the contact tip tapered section 31 into the diffuser bore 11 at its downstream end 3 until the contact tip threads 39 abut the diffuser threads 41. The contact tip is turned such that the threads of the two parts mate. Additional turning of the contact tip advances its frusto-conical surface 33 to approach the diffuser frusto-conical surface 43. Preferably, the threads and frusto-conical surfaces of the contact tip and diffuser are so dimensioned that the contact tip frusto-conical surface engages the diffuser frusto-conical surface after the contact tip has made one or slightly more or less than one complete turn. At that point, the contact tip is firmly assembled to the diffuser. An intentional and substantial reverse torque must be applied to the contact tip to remove it from the diffuser. On the other hand, when it is necessary to replace a worn contact tip, a single reverse turn is all that is required to remove it from the diffuser.

In summary, the results and advantages of MIG welding guns can now be more fully realized. The present invention provides the benefit of increased surface areas for the conduction of electric current from the diffuser 1 to the contact tip 19. Not only are the engaged frusto-conical surfaces 33 and 43 capable of transmitting large currents, but also the mating threads 37 and 41 have more contact area than is normally possible with a contact tip with a given cylindrical section outer diameter. Further, the combination of 14 pitch for the contact tip threads as well as the rolling process for producing the threads minimizes the cost of the contact tip.

Thus, it is apparent that there has been provided, tie in accordance with the invention, a welding contact tip with rolled threads that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A contact tip for a MIG welding gun having first and second ends, a cylindrical section of predetermined outer diameter adjacent the first end, a tapered section adjacent the second end, and threads between the cylindrical and tapered sections,, the threads being rolled from the cylindrical section outer diameter to produce a thread major diameter greater than the predetermined outer diameter and a minor diameter less than the predetermined outer diameter.

2. The contact tip of claim 1 wherein the cylindrical section predetermined outer diameter is approximately 0.350 inches, the threads major diameter is approximately 0.375 inches, and the threads minor diameter is approximately 0.320 inches.

3. The contact tip of claim 1 wherein the threads are stub acme threads having a major diameter of approximately 0.375 inches.

4. The contact tip of claim 3 wherein the cylindrical section predetermined outer diameter is approximately 0.350 inches.

5. The contact tip of claim 3 wherein the threads have a pitch of 14 threads per inch.

6. The contact tip of claim 2 wherein the threads are stub acme threads having a pitch of 14 threads per inch.

7. In combination with a MIG welding gun for feeding a weld wire in a downstream direction to a workpiece, a contact tip that guides the weld wire to the workpiece comprising a cylindrical section of a predetermined outer diameter adjacent a first end of the contact tip, a tapered section adjacent a second end of the contact tip, and rolled threads between the cylindrical and tapered sections, the contact tip having a hole therethrough between the first and second ends that receives and guides the weld wire, the threads having a major diameter greater than the predetermined outer diameter and a minor diameter less than the predetermined outer diameter.

8. The combination of claim 7 wherein the predetermined outer diameter is approximately 0.350 inches, the threads major diameter is approximately 0.375 inches, and the threads minor diameter is approximately 0.320 inches.

9. The combination of claim 8 wherein the threads are stub acme threads.

10. The combination of claim 9 wherein the threads have a pitch of 14 threads per inch.

11. Apparatus for guiding a weld wire to a workpiece and for conducting electric current to the weld wire comprising:
   a. an electrically conductive contact tip having first and second ends, and a hole therebetween sized to receive and guide a weld wire, the contact tip having a cylindrical section of a predetermined outer diameter adjacent the first end, a tapered section with an exterior frusto-conical surface adjacent the second end, and at least one turn of a rolled thread between the cylindrical and tapered sections having a major diameter greater than the predetermined outer diameter and a minor diameter less than the predetermined outer diameter; and
   b. an electrically conductive diffuser having first and second ends and a bore therebetween, the bore defining internal threads adjacent the first end that mate with said at least one turn of contact tip thread, the diffuser further having a frusto-conical surface adjacent the internal threads thereof that engages the contact tip frusto-conical surface,
      so that electric current is conducted between the diffuser and the contact tip through the respective engaged frusto-conical surfaces and the mating threads.

12. The apparatus of claim 11 wherein:
   a. the predetermined outer diameter of the contact tip cylindrical section is approximately 0.350 inches; and
   b. said at least one turn of contact tip thread has a major diameter of approximately 0.375 inches, and a minor diameter of approximately 0.320 inches.

13. The combination of claim 12 wherein the contact tip and diffuser threads are stub acme threads and having a pitch of 14 threads per inch.

14. The apparatus of claim 11 wherein the contact tip frusto-conical surface engages the diffuser frusto-conical surface when said at least one turn of contact tip thread has engaged a single turn on the diffuser thread.

15. A method of manufacturing a MIG welding gun contact tip comprising the steps of:
   a. providing a blank of a selected electrically conductive material having first and second ends;
   b. forming a cylindrical section of a predetermined outer diameter adjacent the blank first end;
   c. forming an exterior frusto-conical surface on the blank adjacent the second end thereof; and
   d. rolling threads from the cylindrical section outer diameter and producing the threads with a major diameter greater than the cylindrical section outer diameter and a minor diameter less than the cylindrical section outer diameter.

16. The method of claim 15 wherein the step of rolling threads comprises the step of rolling the threads as a stub acme threads.

17. The method of claim 15 wherein:
   a. the step of forming a cylindrical section comprises the step of forming the cylindrical section with a predetermined outer diameter of approximately 0.350 inches; and
   b. the step of rolling threads comprises the step of rolling the threads with a major diameter of approximately 0.375 inches and a minor diameter of approximately 0.320 inches.

18. The method of claim 17 wherein the step of rolling threads comprises the further step of rolling stub acme threads having a pitch of 14 threads per inch.

* * * * *